US012047892B2

(12) United States Patent
Leneave et al.

(10) Patent No.: US 12,047,892 B2
(45) Date of Patent: Jul. 23, 2024

(54) SYNCHRONIZATION IN SEVERE-FADING ENVIRONMENTS

(71) Applicant: Raytheon Company, Waltham, MA (US)

(72) Inventors: Brian Leneave, Idaho Falls, ID (US); Brett Joseph Steenblik, Vail, AZ (US); David G. Manzi, Tucson, AZ (US)

(73) Assignee: Raytheon Technologies Corporation, Tewksbury, MA (US)

( * ) Notice: Subject to any disclaimer, the term of this patent is extended or adjusted under 35 U.S.C. 154(b) by 372 days.

(21) Appl. No.: 17/339,792

(22) Filed: Jun. 4, 2021

(65) Prior Publication Data

US 2022/0394646 A1 Dec. 8, 2022

(51) Int. Cl.
*H04W 56/00* (2009.01)
(52) U.S. Cl.
CPC .............................. *H04W 56/0015* (2013.01)
(58) Field of Classification Search
CPC .................................................. H04W 56/0015
See application file for complete search history.

(56) References Cited

U.S. PATENT DOCUMENTS

| 8,446,990 | B2* | 5/2013 | Liu ..................... H04L 27/2678 375/259 |
| 2007/0280098 | A1* | 12/2007 | Bhatt .................. H04L 27/2656 370/208 |
| 2015/0229507 | A1* | 8/2015 | Kim ..................... H04L 27/2613 375/260 |

FOREIGN PATENT DOCUMENTS

| EP | 0650274 A2 | * | 4/1995 | |
| JP | 2000286754 A | * | 10/2000 | ............. G06F 17/15 |
| JP | 4857466 B2 | * | 1/2012 | ........... G01S 13/325 |
| WO | WO-2010148149 A1 | * | 12/2010 | ............... H04L 1/16 |

OTHER PUBLICATIONS

F. Tufvesson, O. Edfors, and M. Faulkner, titled "Time and frequency synchronization for OFDM using PN-sequence preambles", in Proc. VTC' 99, vol. 4, pp. 2203-2207, Sep. 1999.*
International Search Report and Written Opinion dated Jul. 19, 2022 for corresponding PCT Application No. PCT/US2022/023345, 13 pages.

* cited by examiner

*Primary Examiner* — Saad A. Waqas
(74) *Attorney, Agent, or Firm* — Kinney & Lange, P.A.

(57) ABSTRACT

Apparatus and associated methods relate to providing robust synchronization of a Radio-Frequency (RF) communication in a severe-fading environment. A first portion of a detected RF signal is auto-correlated with a second portion of the detected RF signal. The first and second portions are time-separated by the predetermined time delay separating the first and second code-sequences. A third portion of the detected RF signal is sync-correlated with a sync-sequence so as to generate a sync-correlation signal. The third portion is of the predetermined length of the sync sequence and includes the first and second portions of the detected RF signal used to generate the auto-correlation signal. The auto-correlation signal is multiplied by the sync-correlation signal so as to generate a combined synchronization signal. A peak in the combined synchronization signal is then detected. This peak can be indicative of a synchronization time of an authorized communication.

17 Claims, 6 Drawing Sheets

SYNCHRONIZATION IN SEVERE-FADING ENVIRONMENTS

STATEMENT OF GOVERNMENT INTEREST

This invention was made with government support under government contract HQ0147-17-C-0003 awarded by the United States Department of Defense. The United States government has certain rights in the invention.

BACKGROUND

RF communications are performed for various purposes. Some communication channels present challenging scenarios for good reception and fidelity of RF communications. For example, in some venues, numerous transceivers compete for limited communications' bandwidth. In some venues, measures are taken to actively jam a communication channel. In urban venues, buildings and other structures can limit the paths of RF communications to various routes throughout the urban center. Such challenging venues, sometimes termed severe-fading environments, can make synchronization to communications from authorized transmitters challenging.

SUMMARY

Apparatus and associated methods relate to a system identifying and synchronizing to a sync-sequence of a predetermined length having a first and second code-sequences separated by a predetermined delay time. The system includes a Radio-Frequency (RF) receiver, a process, and computer-readable memory. The RF receiver that receives a RF signal within a predetermined frequency band; The computer-readable memory is encoded with instructions that, when executed by the processor, causes the system to auto-correlate a first portion of the signal generated with the second portion of the signal generated so as to generate an auto-correlation signal. The first and second portions are time-separated by the predetermined time delay separating the first and second code-sequences. The computer-readable memory is encoded with instructions that, when executed by the processor, causes the system to sync-correlate a third portion of the signal generated with a sync-sequence so as to generate a sync-correlation signal. The third portion is of the predetermined length of the sync sequence and includes the first and second portions of the signal generated used to generate the auto-correlation signal. The computer-readable memory is encoded with instructions that, when executed by the processor, causes the system to multiply the auto-correlation signal and the sync-correlation signal so as to generate a combined synchronization signal. computer-readable memory is also encoded with instructions that, when executed by the processor, causes the system to identify a peak in the combined synchronization signal.

Some embodiments relate to a method for identifying and synchronizing to a sync-sequence of a predetermined length having a first and second code-sequences separated by a predetermined delay time. The method includes detecting Radio-Frequency (RF) energy within a predetermined frequency band. The method includes generating a signal indicative of the RF energy detected. The method includes auto-correlating a first portion of the signal generated with the second portion of the signal generated so as to generate an auto-correlation signal. The first and second portions are time-separated by the predetermined time delay separating the first and second code-sequences. The method includes sync-correlating a third portion of the signal generated with a sync-sequence so as to generate a sync-correlation signal. The third portion is of the predetermined length of the sync sequence and includes the first and second portions of the signal generated used to generate the auto-correlation signal. The method includes multiplying the auto-correlation signal and the sync-correlation signal so as to generate a combined synchronization signal. The method also includes identifying a peak in the combined synchronization signal.

Some embodiments relate to a method for generating and communicating a sync sequence so as to indicate that a transmitted signal is from an authorized transmitter. The method includes transmitting a first code-sequence. The method includes transmitting a second code-sequence at a predetermined time delay after the first code-sequence was transmitted. The second code-sequence is identical to the first code sequence. The method also includes transmitting a communication following transmission of and synchronized to the second code sequence.

DETAILED DESCRIPTION

Apparatus and associated methods relate to providing robust synchronization of a Radio-Frequency (RF) communication in a severe-fading environment. A first portion of a detected RF signal is auto-correlated with the second portion of the detected RF signal. The first and second portions are time-separated by the predetermined time delay separating the first and second code-sequences. A third portion of the detected RF signal is sync-correlated with a sync-sequence so as to generate a sync-correlation signal. The third portion is of the predetermined length of the sync sequence and includes the first and second portions of the detected RF signal used to generate the auto-correlation signal. The auto-correlation signal is multiplied by the sync-correlation signal so as to generate a combined synchronization signal. A peak in the combined synchronization signal is then detected. This peak can be indicative of a synchronization time of an authorized communication.

Figure 1:
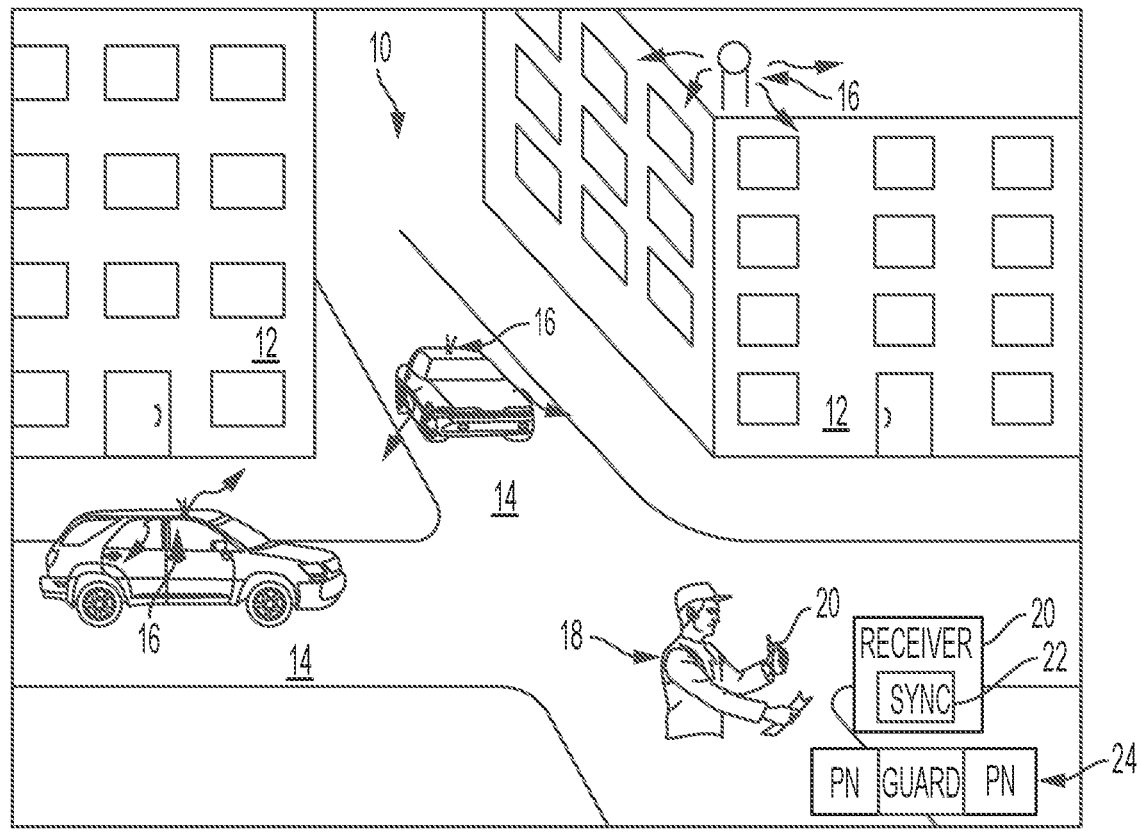
FIG. 1 is a perspective view of a Radio-Frequency (RF) communication being performed within a severe-fading environment.

FIG. 1 is a perspective view of a Radio-Frequency (RF) communication being performed within a severe-fading environment. In FIG. 1, urban center 10 includes buildings 12, streets 14, and various channel-competing transmitters 16. Person 18 is attempting to receive a communication, via receiver 20 configured with severe-fading tolerant synchronization system 22, from an authorized transmitter from some distance away. Severe-fading tolerant synchronization system 22 detects and synchronizes to synchronization sequences of a communication, such as sync-sequence 24 of a predetermined structure. Sync-sequence 24 has a predetermined length ($L_{SYNC}$) and includes two pseudo-noise (PN) code sequences, $PN_1$ and $PN_2$, time separated from one another by a predetermined time delay ($T_{DELAY}$). As depicted in FIG. 1, a guard band can be interposed between the two PN code sequences, $PN_1$ and $PN_2$. In other embodiments, the two PN code sequences, $PN_1$ and $PN_2$, can be immediately time adjacent to one another (i.e., the second PN code sequence, $PN_2$, can immediately follow the first PN code sequence, $PN_1$).

Sync-sequences, as sync-sequence 24, can be embedded into an associated communication, such as, for example, as a header of the associated communication. Sync-sequence 24 can have a predetermined time relation to the associated communication, such that, when sync-sequence 24 is detected, the associated communication has a predetermined time relation thereto. For example, the associated communication can begin, for example, after a predetermined time delay ($T_{COM}$) after sync-sequence 24. In some embodiments, the communication can begin immediately following sync-sequence 24. In other embodiments, the communication can precede sync sequence 24.

Severe-fading tolerant synchronization system 22 detects and synchronizes to sync-sequence 24 using an algorithm that will be described in more detail below with reference to the subsequent figures. In a nutshell, severe-fading tolerant synchronization system 22 detects and synchronizes to sync-sequence 24 by continually sync-correlating the expected sync-sequence with the latest received RF signal of the predetermined length $L_{SYNC}$, while simultaneously windowing the sync-correlation by auto-correlation of the first and second PN codes, $PN_1$ and $PN_2$.

This auto-correlation is performed by performing a correlation of the latest received RF signal of the predetermined length of the PN code ($L_{PN}$) with a previously received RF signal of the predetermined length of the PN code ($L_{PN}$) that was received earlier by a time separation of the predetermined time delay ($T_{DELAY}$). This auto-correlation will produce a signal that begins to increase in magnitude when the second PN code, $PN_2$, begins to be received, as at that time, the latest received signal is indeed correlated to the signal received exactly $T_{DELAY}$ earlier. The magnitude of the auto-correlation will continue to increase until the time that the entire second PN code, $PN_2$, is received, as at that time, the latest $L_{PN}$ time-duration of the received signal correlates with the $L_{PN}$ time duration of the signal received exactly $T_{DELAY}$ earlier. The magnitude of the auto-correlation will then decrease after the entire second PN code, $PN_2$, has been received, for the next $L_{PN}$ time duration, until no more signal correlation can be expected.

This continuous auto-correlation is effectively a continuous testing of whether the RF energy has the requisite repeated pattern separated by the predetermined time delay ($T_{DELAY}$) therein. If the RF energy detected by receiver 20 does not have this requisite pattern, then the weighting of the sync-correlation will be modest (e.g., only how random noise energy will auto-correlate in the requisite pattern). Thus, if the requisite pattern is not detected via auto-correlation, then the sync-correlation will be weighted very low. If, however, the requisite pattern is detected via auto-correlation, the sync-correlation will be weighted accordingly high. The PN code can be selected such that the sync-correlation results in detection only when the entire sync-sequence has been received. Thus, although the auto-correlation signal is relatively broad in the time domain (e.g., roughly twice the length of the PN code, $L_{PN}$), the sync-correlation signal is very narrow (e.g., roughly the length of a single transmitted bit of transmitted PN code). The auto-correlation and sync-correlations signals will be detailed below with reference to FIG. 5.

Figure 2:
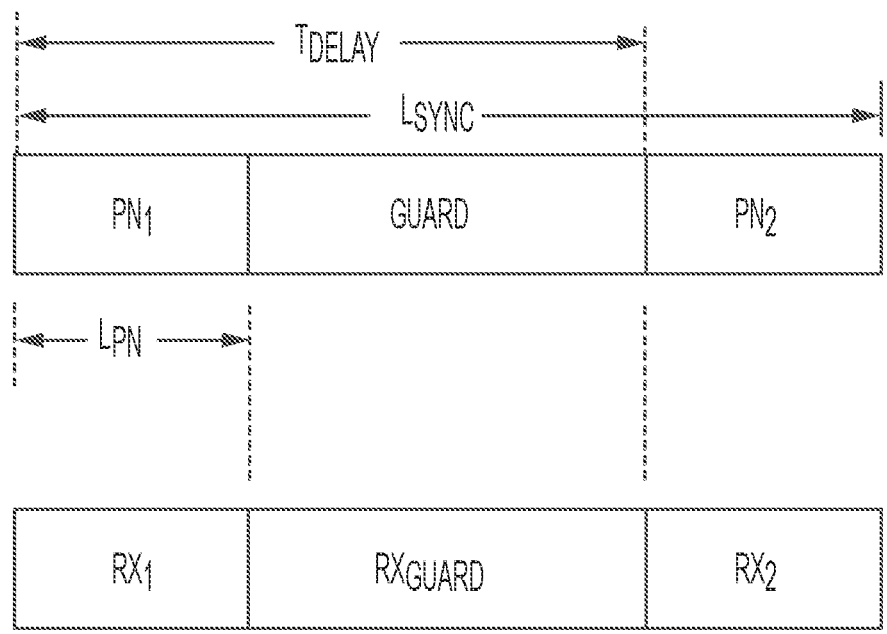
FIG. 2 is a diagram of a sync-sequence used for synchronizing within a severe-fading environment.

FIG. 2 is a diagram of a sync-sequence used for synchronizing within a severe-fading environment. In FIG. 2, sync-sequence 24 is of the predetermined length $L_{SYNC}$. sync-sequence 24 includes first and second PN codes, $PN_1$ and $PN_2$, time separated from one another by a predetermined time delay $T_{DELAY}$. The predetermined time delay $T_{DELAY}$ is longer than the length $L_{PN}$ of each of first and second PN codes, $PN_1$ and $PN_2$. Because the predetermined time delay $T_{DELAY}$ is longer than the length $L_{PN}$ of the PN codes, a guard band is between first and second PN codes, $PN_1$ and $PN_2$. In some embodiments this guard band can either include coded data transmitted by the transmitter. In other embodiments, the transmitter might not transmit any data during this guard band.

Juxtaposed directly beneath sync-sequence 24 is a received sequence $RX_{SEQ}$. The received sequence $RX_{SEQ}$ is of the predetermined length $L_{SYNC}$. The received sequence $RX_{SEQ}$ can be the latest portion of a signal indicative of the RF energy detected by receiver 20 (depicted in FIG. 1), for example. The received sequence $RX_{SEQ}$ includes a first and second portions, $RX_1$ and $RX_2$, time-separated by the predetermined time delay $T_{DELAY}$ separating the first and second PN code-sequences, $PN_1$ and $PN_2$. Because the predetermined time delay $T_{DELAY}$ is longer than the length $L_{PN}$ of first and second portions, $RX_1$ and $RX_2$, a guard band $RX_{GUARD}$ is between first and second portions, $RX_1$ and $RX_2$. If the latest portion of the received sequence $RX_{SEQ}$ happens at the time that sync-sequence 24 is detected by receiver 20, then first and second portions, $RX_1$ and $RX_2$, of received sequence $RX_{SEQ}$ will contain RF energy corresponding to transmitted first and second PN codes, $PN_1$ and $PN_2$ (as well as noise from the various noise sources). So too will the guard band of received sequence $RX_{SEQ}$ contain RF energy corresponding to the encoded data, in embodiments in which the transmitter transmits such encoded data.

Figure 3:
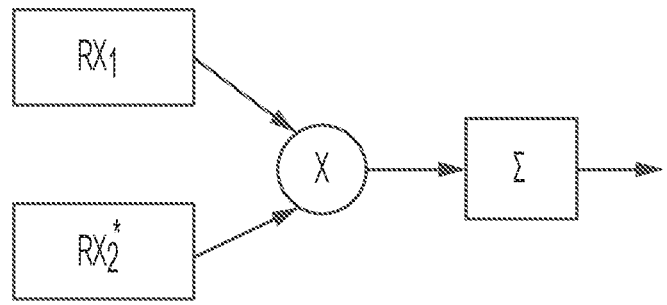
FIG. 3 is a schematic diagram of auto-correlation of first and second portions of an RF signal received.

FIG. 3 is a schematic diagram of auto-correlation of first and second portions of an RF signal received. In FIG. 3. first and second portions, $RX_1$ and $RX_2$, of the received sequence $RX_{SEQ}$ are auto-correlated with one another. Auto-correlation can be performed by convolving a conjugated version of one of the first and second portions, $RX_1$ and $RX_2$, of the received sequence $RX_{SEQ}$ with an unconjugated version of the other of the first and second first portions, $RX_2$ and $RX_1$, of the received sequence $RX_{SEQ}$. In the FIG. 3 embodiment, second portion, $RX_2$, is conjugated, and first portion, $RX_1$, is not conjugated. After such conjugation of one of the first and second portions, $RX_1$ and $RX_2$, the two sequences are multiplied together in bit-by-bit fashion, and then each of these resulting bit-products are summed together. Convolution results as such a sum of bit-products is performed continuously so as to detect when the received sequence $RX_{SEQ}$ contains RF energy pertaining to such a correlation of first and second PN codes, $PN_1$ and $PN_2$.

Figure 4:
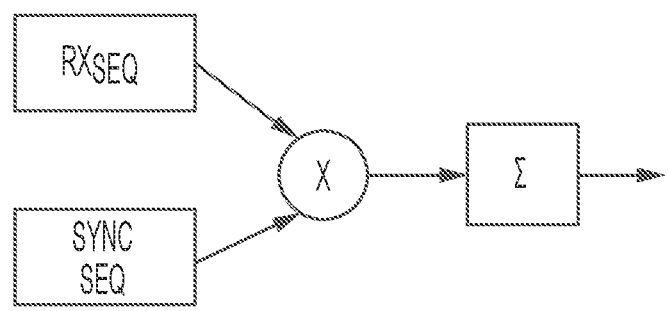
FIG. 4 is a schematic diagram of sync-correlation of a third portion of an RF signal received with a sync-sequence.

FIG. 4 is a schematic diagram of sync-correlation of a third portion of an RF signal received with a sync-sequence. In FIG. 4, the received sequence $RX_{SEQ}$ is sync-correlated with sync-sequence 24. Sync-correlation can be performed by convolving a conjugated version of one of the received sequence, $RX_{SEQ}$, or sync-sequence 24, with an unconjugated version of the other of the received sequence, $RX_{SEQ}$, or sync-sequence 24. In the FIG. 4 embodiment, sync-sequence 24 is conjugated, and the received sequence, $RX_{SEQ}$, is not conjugated. After such conjugation of one of the received sequence, $RX_{SEQ}$, or sync-sequence 24, the two sequences are multiplied together in bit-by-bit fashion, and then each of these resulting bit-products are summed together. Convolution results as such a sum of bit-products is performed continuously so as to detect when the received sequence $RX_{SEQ}$ contains RF energy pertaining to sync-sequence 24.

Figure 5:
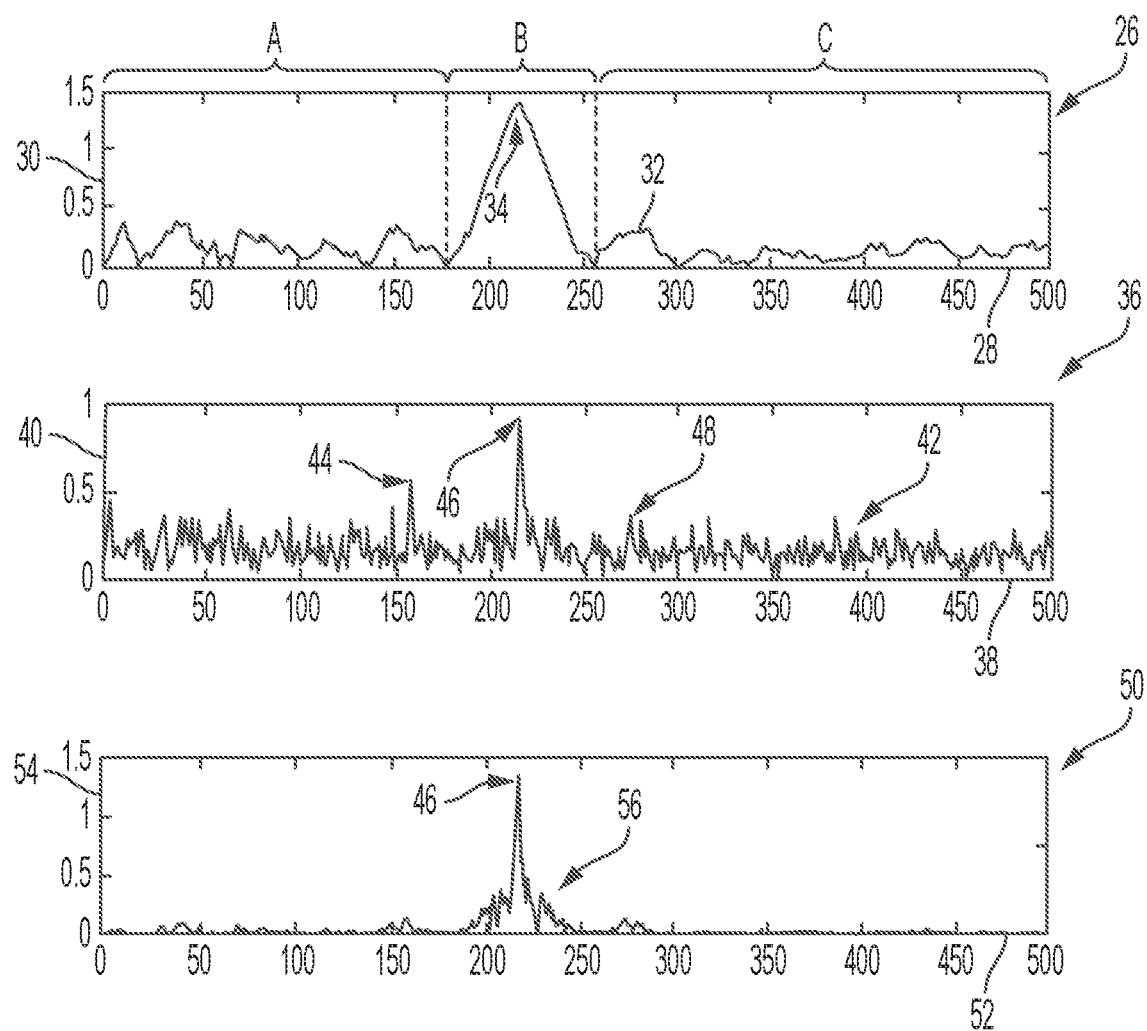
FIG. 5 are graphs of auto-sequence, sync-sequence, and combined correlation signals generated.

FIG. 5 are graphs of auto-sequence, sync-sequence, and combined correlation signals generated. In FIG. 5, graph 26 includes horizontal axis 28, vertical axis 30, and auto-correlation signal 32. Horizontal axis 28 is indicative of time. Vertical axis 30 is indicative of magnitude of auto-correlation signal 32. Auto-correlation signal 32 represents the signal generated by the auto-correlation algorithm, such as, for example, the auto-correlation algorithm depicted in FIG. 3. In regions A and C of graph 26, the received sequence $RX_{SEQ}$ contains RF energy pertaining to no portions or of sync-sequence 24 or at most portions of only one of first and second PN codes, $PN_1$ and $PN_2$ (depicted in FIG. 2). Therefore, in regions A and C of graph 26, the magnitude of auto-correlation signal 32 is relatively low. In region B of graph 26, the received sequence $RX_{SEQ}$ contains RF energy pertaining to portions both of first and second PN codes, $PN_1$ and $PN_2$. At or near peak 34 of auto-correlation signal 32, the received sequence $RX_{SEQ}$ contains RF energy pertaining to all of first and second PN codes, $PN_1$ and $PN_2$.

In FIG. 5, graph 36 includes horizontal axis 38, vertical axis 40, and sync-correlation signal 42. Horizontal axis 38 is again indicative of time. Vertical axis 40 is indicative of magnitude of sync-correlation signal 42. Sync-correlation signal 42 represents the signal generated by the sync-correlation algorithm, such as, for example, the auto-correlation algorithm depicted in FIG. 4. Sync-correlation signal 42 contains peaks 44, 46, and 48. Unlike auto-correlation signal 32 of graph 26, peaks 44, 46, and 48 have a length of only one bit of sync-sequence 24. Peak 44 occurs when the received sequence $RX_{SEQ}$ contains RF energy pertaining to first PN code, $PN_1$, aligned so as to second PN code, $PN_2$, during sync-correlation. Peak 46 occurs when the received sequence $RX_{SEQ}$ contains RF energy pertaining to both first and second PN codes, $PN_1$ and $PN_2$, which are perfectly aligned with the first and second PN codes, $PN_1$ and $PN_2$, of sync-sequence 24, during sync-correlation. Peak 48 occurs when the received sequence $RX_{SEQ}$ contains RF energy pertaining to second PN code, $PN_2$, aligned so as to first PN code, $PN_1$, during sync-correlation. Thus, in the absence of noise, peaks 44 and 48 should have magnitudes have as large as peak 46 (for embodiments that have no guard band or no code data in the guard band). In a severe-fading environment, however, the relative magnitudes of peaks 44, 46, and 48 are uncertain. Thus, auto-correlation signal 32 of graph 26 can be used in a windowing fashion, so as to weight peak 46 greater than peaks 44 and 48.

In FIG. 5, graph 50 includes horizontal axis 52, vertical axis 54, and combined-correlation signal 56. Horizontal axis 52 is again indicative of time. Vertical axis 54 is indicative of magnitude of combined-correlation signal 56. Combined-correlation signal 56 represents the signal generated by taking the product of auto-correlation signal 32 of graph 26 and sync-correlation signal 42 or graph 36. As depicted in graph 50, peaks 44 and 48 have been squelched by the windowing function resulting from taking the produce of auto-correlation signal 32 of graph 26 and sync-correlation signal 42 or graph 36. Thus, peak 46 has been isolated so as to facilitate detection thereof and synchronization thereto.

The received sequence $RX_{SEQ}$ can also be used to modify or determine an optimal demodulation frequency for use in decoding the communication associated with sync-sequence 24. To determine such a demodulation frequency, the first and second portions, $RX_1$ and $RX_2$, of received sequence RX SEQ are multiplied by a conjugated PN code, to form a series of bit products. These bit-products are then summed. The sum of the bit-products of the first portion $RX_1$ and the conjugated PN code results in a first phase angle $\theta_1$. The sum of the bit-products of the second portion $RX_2$ and the conjugated PN code results in a second phase angle $\theta_2$. The demodulation frequency can be estimated based on the difference of the first and second phase angles, $\theta_1$ and $\theta_2$:

$$f_{Demodulatioin} = \frac{\theta_2 - \theta_1}{T_{DELAY}} \times f_S, \tag{1}$$

where fs is the sampling frequency.

Figure 6:
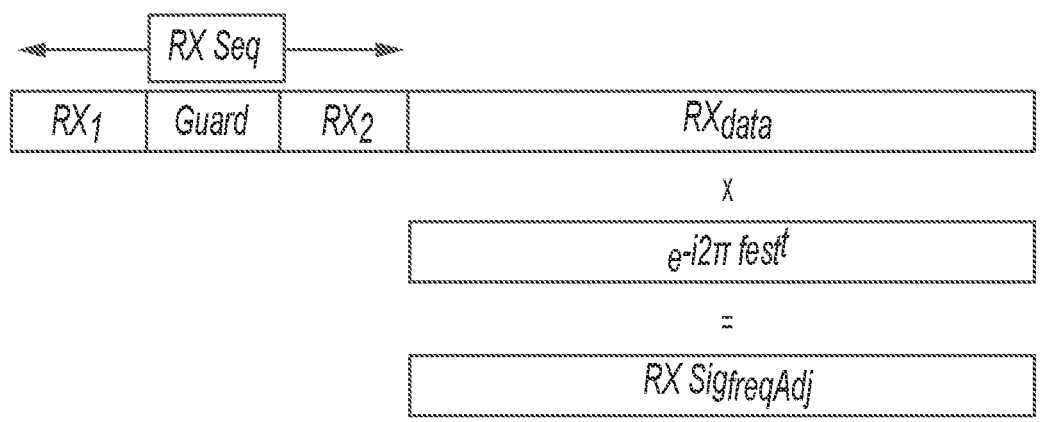
FIG. 6 is a schematic diagram signal decoding of a synchronized RF communication.

FIG. 6 is a schematic diagram signal decoding of a synchronized RF communication. In FIG. 6, the communication associated with sync-sequence 24 is demodulated using a sinusoid of the demodulation frequency as determined above. The start of the encoded communication $RX_{DATA}$ is determined based on timing of peak 46 of combined-correlation signal 56, as depicted in FIG. 5. The encoded communication $RX_{DATA}$ is multiplied by a sinusoid of the negative frequency:

$$RX_{Demodulation} = RS_{DATA} \times e^{-i2\pi f_{Demodulation} t} \tag{2}$$

Such a demodulated signal can then be decoded according to whatever encoding scheme had been used for transmission.

Figure 7:
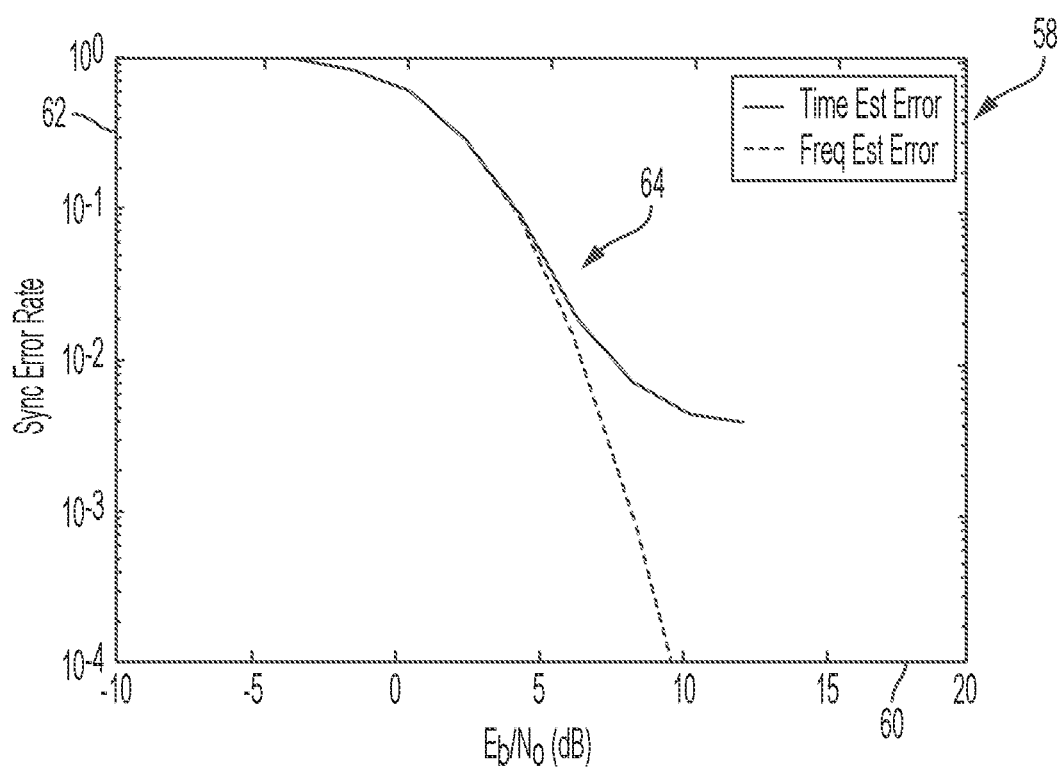
FIG. 7 is a graph indicating signal-to-noise ratios of communications both synchronized and not synchronized using the combined correlation signal.

FIG. 7 is a graph indicating signal-to-noise ratios of communications both synchronized and not synchronized using the combined correlation signal. In FIG. 7, graph 58 includes horizontal axis 60, vertical axis 62, synchronization error rate relation 64. Horizontal axis 60 is indicative of signal-to-noise ratio. Vertical axis 62 is indicative of synchronization error rate. Synchronization error rate relation 64 indicates for signal-to-noise ratios above signal-to-noise threshold $SN_{THRESH}$, synchronization error rates are below 1%. Thus, precise synchronization of communications can be performed using the disclosed method with low synchronization error rates if the signal-to-noise ratios above the signal-to-noise threshold $SN_{THRESH}$. In some embodiments, such a signal-to-noise threshold $SN_{THRESH}$ can be as low as 3, 4, or 5, as normalized to the energy of a signal bit.

Discussion of Possible Embodiments

The following are non-exclusive descriptions of possible embodiments of the present invention.

Apparatus and associated methods relate to a system identifying and synchronizing to a sync-sequence of a predetermined length having a first and second code-sequences separated by a predetermined delay time. The system includes a Radio-Frequency (RF) receiver, a process, and computer-readable memory. The RF receiver that receives a RF signal within a predetermined frequency band; The computer-readable memory is encoded with instructions that, when executed by the processor, causes the system to auto-correlate a first portion of the signal generated with the second portion of the signal generated so as to generate an auto-correlation signal. The first and second portions are time-separated by the predetermined time delay separating the first and second code-sequences. The computer-readable memory is encoded with instructions that, when executed by the processor, causes the system to sync-correlate a third portion of the signal generated with a sync-sequence so as to generate a sync-correlation signal. The third portion is of the predetermined length of the sync sequence and includes the first and second portions of the signal generated used to generate the auto-correlation signal. The computer-readable memory is encoded with instructions that, when executed by the processor, causes the system to multiply the auto-correlation signal and the sync-correlation signal so as to generate a combined synchronization signal. computer-readable memory is also encoded with instructions that, when executed by the processor, causes the system to identify a peak in the combined synchronization signal.

The system of the preceding paragraph can optionally include, additionally and/or alternatively, any one or more of the following features, configurations and/or additional components:

A further embodiment of the foregoing system, wherein the first and second code-sequences can be identical to one another.

A further embodiment of any of the foregoing systems, wherein the computer-readable memory can be further encoded with instructions that, when executed by the processor, causes the system to compare the peak identified with a predetermined threshold.

A further embodiment of any of the foregoing systems, wherein the computer-readable memory can be further encoded with instructions that, when executed by the processor, causes the system to determine, if the peak identified is greater than the predetermined threshold, a synchronizing time of a valid transmission received at a time corresponding to the peak identified.

A further embodiment of any of the foregoing systems, wherein the computer-readable memory can be further encoded with instructions that, when executed by the processor, causes the system to interpret the RF energy detected following the synchronizing time as an encoded communication transmitted by an authorized transmitter.

A further embodiment of any of the foregoing systems, wherein the computer-readable memory can be further encoded with instructions that, when executed by the processor, causes the system to estimate a frequency of transmission based on the first and second portions of the signals generated.

A further embodiment of any of the foregoing systems, wherein the computer-readable memory can be further encoded with instructions that, when executed by the processor, causes the system to decode the encoded communication transmitted by an authorized transmitter by multiplying the encoded communication by a sinusoid corresponding to the frequency of transmission estimated.

A further embodiment of any of the foregoing systems, wherein auto-correlating the first portion of the signal generated with the second portion of the signal generated includes convolving a conjugated version of one of the first and second portions of the signal generated with an unconjugated version of the other of the first and second portions of the signal generated.

A further embodiment of any of the foregoing systems, wherein auto-correlating the first portion of the signal generated with the second portion of the signal generated includes convolving a conjugated version of third portion of the signal generated with an unconjugated version of the third portion of the signal generated.

Some embodiments relate to a method for identifying and synchronizing to a sync-sequence of a predetermined length having a first and second code-sequences separated by a predetermined delay time. The method includes detecting Radio-Frequency (RF) energy within a predetermined frequency band. The method includes generating a signal indicative of the RF energy detected. The method includes auto-correlating a first portion of the signal generated with the second portion of the signal generated so as to generate an auto-correlation signal. The first and second portions are time-separated by the predetermined time delay separating the first and second code-sequences. The method includes sync-correlating a third portion of the signal generated with a sync-sequence so as to generate a sync-correlation signal. The third portion is of the predetermined length of the sync sequence and includes the first and second portions of the signal generated used to generate the auto-correlation signal. The method includes multiplying the auto-correlation signal and the sync-correlation signal so as to generate a combined synchronization signal. The method also includes identifying a peak in the combined synchronization signal.

The method of the preceding paragraph can optionally include, additionally and/or alternatively, any one or more of the following features, configurations and/or additional components:

A further embodiment of the foregoing method, wherein the first and second code-sequences can be identical to one another.

A further embodiment of any of the foregoing methods can further include comparing the peak identified with a predetermined threshold.

A further embodiment of any of the foregoing methods can further include determining, if the peak identified is greater than the predetermined threshold, a synchronizing time of a valid transmission received at a time corresponding to the peak identified.

A further embodiment of any of the foregoing methods can further include interpreting the RF energy detected following the synchronizing time as an encoded communication transmitted by an authorized transmitter.

A further embodiment of any of the foregoing methods can further include estimating a frequency of transmission based on the first and second portions of the signals generated.

A further embodiment of any of the foregoing methods, wherein estimating the frequency of transmission can include: i) convolving the first portion of the signal generated with a conjugate of the first code sequence so as to generate a first convolution signal; ii) convolving the second portion of the signal generated with a conjugate of the second code sequence so as to generate a second convolution signal; iii) dividing a phase difference between the first and second convolution signals by the predetermined time delay so as to generate a ratio; and iv) multiplying the ratio by a sampling frequency so as to generate the estimate of the frequency of transmission.

A further embodiment of any of the foregoing methods can further include decoding the encoded communication transmitted by an authorized transmitter by multiplying the encoded communication by a sinusoid corresponding to the frequency of transmission estimated.

A further embodiment of any of the foregoing methods, wherein auto-correlating the first portion of the signal generated with the second portion of the signal generated can include convolving a conjugated version of one of the first and second portions of the signal generated with an unconjugated version of the other of the first and second portions of the signal generated.

A further embodiment of any of the foregoing methods, wherein sync-correlating the third portion of the signal generated with a sync-sequence can include convolving a conjugated version of third portion of the signal generated with an unconjugated version of the third portion of the signal generated.

Some embodiments relate to a method for generating and communicating a sync sequence so as to indicate that a transmitted signal is from an authorized transmitter. The method includes transmitting a first code-sequence. The method includes transmitting a second code-sequence at a predetermined time delay after the first code-sequence was transmitted. The second code-sequence is identical to the first code sequence. The method also includes transmitting a communication following transmission of and synchronized to the second code sequence.

The method of the preceding paragraph can optionally include, additionally and/or alternatively, any one or more of the following features, configurations and/or additional components:

A further embodiment of the foregoing method, wherein the predetermined time delay is a first predetermined time delay, and wherein the communication transmitted is synchronized to the second code-sequence by following the second code-sequence by a second predetermined time delay.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for identifying and synchronizing radio communications from an authorized sender, the method comprising:
receiving a Radio-Frequency (RF) signal within a predetermined frequency band;
auto-correlating a first portion of the RF signal received with a second portion of the RF signal received so as to generate an auto-correlation signal, the first and second portions time-separated by a predetermined time delay separating first and second code-sequences of an expected sync-sequence;
sync-correlating the first and second portions of the RF signal received with the expected sync-sequence so as to generate a sync-correlation signal, the expected sync-sequence including first and second portions of the RF signal received together with a guard band being of the same length as predetermined length $L_{SYNC}$ of the expected sync sequence;
wherein the sync-correlating further comprises convolving a conjugated version of the first and second code sequences of the expected sync-sequence with an unconjugated version of the first and second portions of the RF signal received;
multiplying the auto-correlation signal and the sync-correlation signal so as to generate a combined synchronization signal;
identifying a peak in the combined synchronization signal; and
determining a synchronization time of an authorized communication based on the peak identified.

2. The method of claim 1, wherein the first and second code-sequences are identical to one another.

3. The method of claim 1, further comprising:
comparing the peak identified with a predetermined threshold.

4. The method of claim 3, further comprising:
determining, if the peak identified is greater than the predetermined threshold, the synchronizing time of a valid transmission received at a time corresponding to the peak identified.

5. The method of claim 4, further comprising:
interpreting the RF signal received following the synchronizing time as an encoded communication transmitted by an authorized transmitter.

6. The method of claim 5, further comprising:
estimating a frequency of transmission based on the first and second portions of the RF signals received.

7. The method of claim 6, wherein estimating the frequency of transmission includes:
dividing a phase difference between the first and second convolution signals by the predetermined time delay so as to generate a ratio; and
multiplying the ratio by a sampling frequency so as to generate the estimate of the frequency of transmission.

8. The method of claim 7, further comprising:
decoding the encoded communication transmitted by an authorized transmitter by multiplying the encoded communication by a sinusoid corresponding to the frequency of transmission estimated.

9. The method of claim 1, wherein auto-correlating the first portion of the signal received with the second portion of the RF signal received includes:
convolving a conjugated version of one of the first and second portions of the RF signal received with an unconjugated version of the other of the first and second portions of the RF signal received.

10. A system identifying and synchronizing radio communications from an authorized sender, the system comprising:
a Radio-Frequency (RF) receiver that receives a RF signal within a predetermined frequency band; a processor; and computer-readable memory encoded with instructions that, when executed by the processor, causes the system to:
auto-correlate a first portion of the RF signal received with a second portion of the RF signal received so as to generate an auto-correlation signal, the first and second portions time-separated by a predetermined time delay separating first and second code-sequences of an expected sync-sequence;
sync-correlate the first and second portions of the RF signal received with the expected sync-sequence so as to generate a sync-correlation signal, the first and second portions of the RF signal received together with a ward band being of same length as a predetermined length $L_{SYNC}$ of the expected sync-sequence;
wherein the sync-correlating further comprises convolving a conjugated version of the first and second code sequences of the expected sync-sequence with an unconjugated version of the first and second portions of the RF signal received;
multiply the auto-correlation signal and the sync-correlation signal so as to generate a combined synchronization signal;
identify a peak in the combined synchronization signal; and determine a synchronization time of an authorized communication based on the peak identified.

11. The system of claim 10, wherein the first and second code-sequences are identical to one another.

12. The system of claim 10, wherein the computer-readable memory is further encoded with instructions that, when executed by the processor, causes the system to:
compare the peak identified with a predetermined threshold.

13. The system of claim 12, wherein the computer-readable memory is further encoded with instructions that, when executed by the processor, causes the system to:
determine, if the peak identified is greater than the predetermined threshold, the synchronizing time of a valid transmission received at a time corresponding to the peak identified.

14. The system of claim 13, wherein the computer-readable memory is further encoded with instructions that, when executed by the processor, causes the system to:
interpret the RF signal received following the synchronizing time as an encoded communication transmitted by an authorized transmitter.

15. The system of claim 14, wherein the computer-readable memory is further encoded with instructions that, when executed by the processor, causes the system to:
estimate a frequency of transmission based on the first and second portions of the RF signal received.

16. The system of claim 15, wherein the computer-readable memory is further encoded with instructions that, when executed by the processor, causes the system to:
decode the encoded communication transmitted by an authorized transmitter by multiplying the encoded communication by a sinusoid corresponding to the frequency of transmission estimated.

17. The system of claim 10, wherein auto-correlating the first portion of the signal generated with the second portion of the signal generated includes:
convolving a conjugated version of one of the first and second portions of the signal generated with an unconjugated version of the other of the first and second portions of the signal generated.

* * * * *